UNITED STATES PATENT OFFICE.

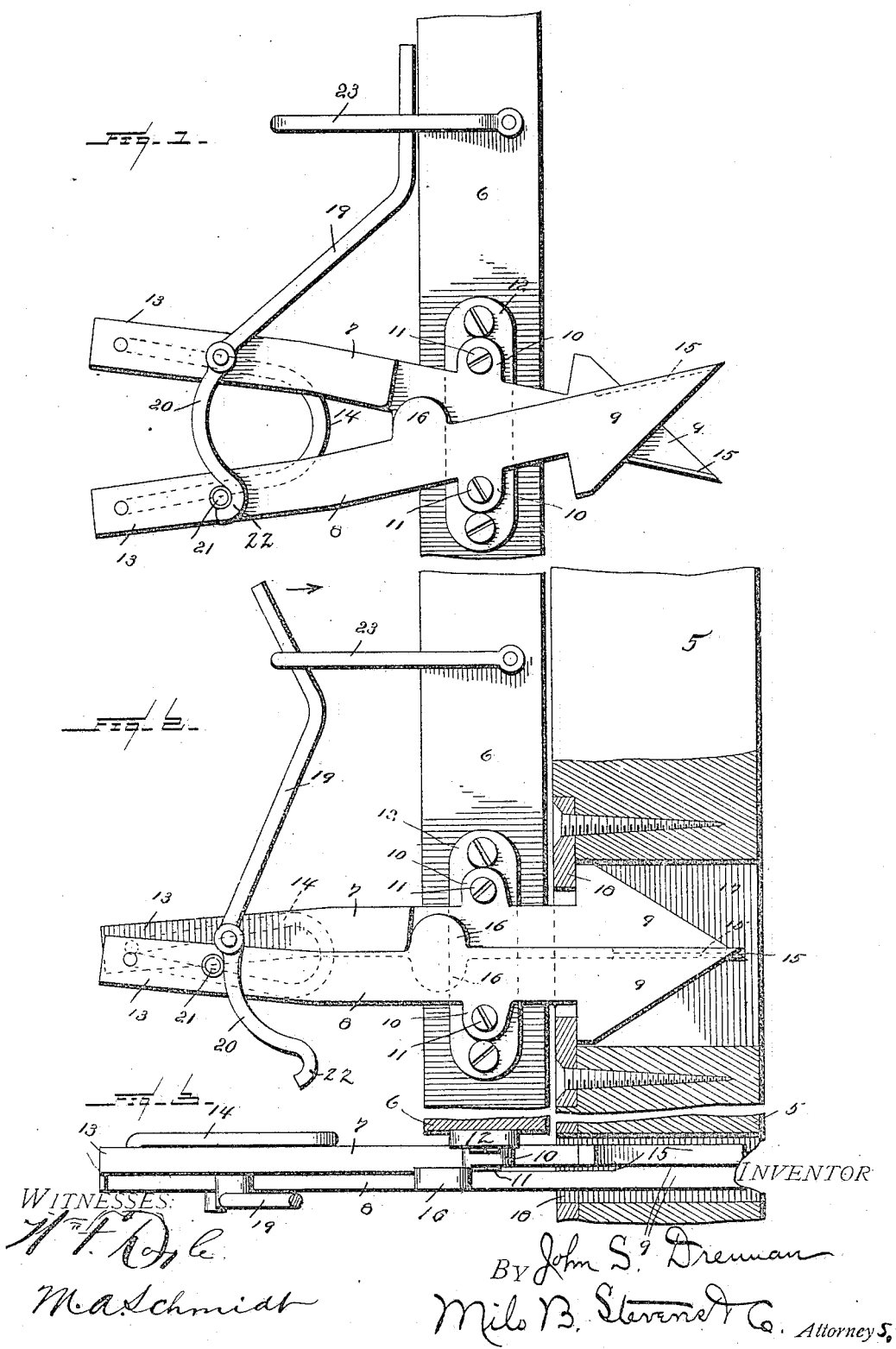

JOHN S. DRENNAN, OF CLEBURNE, TEXAS.

GATE-LATCH.

No. 809,608.      Specification of Letters Patent.      Patented Jan. 9, 1906.

Application filed May 22, 1905. Serial No. 261,610.

*To all whom it may concern:*

Be it known that I, JOHN S. DRENNAN, a citizen of the United States, residing at Cleburne, in the county of Johnson and State of Texas, have invented new and useful Improvements in Gate-Latches, of which the following is a specification.

My invention relates to gate-latches, and has for its object to provide a latch which can be easily operated and is simple in construction and efficient in operation; and to this end the invention consists in certain novel features of construction hereinafter described and claimed.

In the accompanying drawings, Figure 1 is an elevation showing the position of the latch when the gate is open. Fig. 2 shows the same when the gate is closed. Fig. 3 is an edge view of the latch.

Referring specifically to the drawings, 5 denotes the gate, and 6 the latch-post. The latch comprises two arms 7 and 8, respectively, having oppositely-presented hook-shaped front ends 9, which are halved and overlap. At the outer edges of the arms between their ends are ears 10, whereby the arms are pivotally secured, as at 11, to a base, plate 12, fastened to the latch-post. The rear ends 13 of the arm are spaced, and a spring 14 is fastened to said ends. The spring is tempered to draw the ends 13 toward each other, whereby the ends 9 are normally held spread. The inner edges of the ends 9 are raised, as at 15, which parts come together behind each other and prevent the ends from being separated and also limit the inward movement of the ends 13. At the inner edges of the arms 7 and 8, adjacent the ears 10, are ears 16, which are halved and overlap and serve to guide the movement of the arms. The gate has a mortise 17 in its outer edge, which is covered by a plate 18, having an opening through which the latch extends when the gate is closed, as shown in Fig. 2. In this position the hooks 9 are spread and engage behind the plate 18, which prevents withdrawal of the latch. To release the latch and permit it to pass out of the mortise, the rear ends of the arms are spread out, which causes the hooked ends 9 to cross each other and come together, which decreases the distance between the hooks and enables them to clear the plate 18 and pass out of the mortise.

The latch is operated by a lever 19, which is pivoted to the arm 7. The short arm 20 of the lever is cam-shaped and engages a stem 21, projecting from the arm 8. The stem can be fitted with a roller, so that the parts will work smoothly. The free end of the short arm of the lever has a hook 22 adapted to engage the stem 21 and prevent the lever from being swung too far. The long arm of the lever works in a guide 23, secured to the post. When the lever is lifted a bit and swung in the direction indicated by the arrow in Fig. 2, the cam-shaped arm 20 engages the stem 21 and spreads the rear ends of the arms 7 and 8, causing the hooked ends to come together and assume the position shown in Fig. 1 to permit them to pass out of the mortise in the gate, as already explained.

Having thus described my invention, what is claimed as new, and desired to be secured by Letters Patent, is—

1. A gate-latch comprising pivoted arms having hooked front ends, the inner edges of said ends being raised and engaging behind each other; a spring fastened to the rear ends of the arms for holding the hooked ends spread out; and a lever pivoted to one of the arms, and engaging the other arm for spreading said rear ends and drawing the hooked ends together.

2. A gate-latch comprising pivoted arms having hooked front ends which are normally spread out, the inner edges of said ends being raised and engaging behind each other; and means for drawing the hooks together.

In testimony whereof I have signed my name to this specification in the presence of two subscribing witnesses.

JOHN S. DRENNAN.

Witnesses:
    B. S. MILNES,
    GEO. T. CRUMP.